United States Patent
Kuo

(10) Patent No.: US 9,560,535 B2
(45) Date of Patent: Jan. 31, 2017

(54) DATA STREAM GENERATION AND TRANSMISSION SYSTEM AND METHOD THEREFOR

(71) Applicant: Sercomm Corporation, Taipei (TW)

(72) Inventor: Chih-Sheng Kuo, Keelung (TW)

(73) Assignee: SERCOMM CORPORATION, Taipei (TW)

( * ) Notice: Subject to any disclaimer, the term of this patent is extended or adjusted under 35 U.S.C. 154(b) by 298 days.

(21) Appl. No.: 14/044,898

(22) Filed: Oct. 3, 2013

(65) Prior Publication Data

US 2015/0098355 A1    Apr. 9, 2015

(51) Int. Cl.
*H04W 24/02* (2009.01)
*H04N 5/225* (2006.01)

(52) U.S. Cl.
CPC .................................... *H04W 24/02* (2013.01)

(58) Field of Classification Search
CPC ........ H04N 5/2271; H04N 7/10; H04N 7/108; H04N 7/183; H04N 7/185
See application file for complete search history.

(56) References Cited

U.S. PATENT DOCUMENTS

| 8,438,319 | B1 * | 5/2013 | Edney ....................... G06F 5/00 710/106 |
| 2003/0045236 | A1 * | 3/2003 | Chang ................... H04W 88/02 455/41.1 |
| 2006/0120313 | A1 * | 6/2006 | Moritomo ......... H04W 52/0225 370/311 |
| 2009/0128634 | A1 * | 5/2009 | Miura et al. ............... 348/207.1 |
| 2010/0182428 | A1 * | 7/2010 | Lu et al. ....................... 348/143 |
| 2010/0182633 | A1 * | 7/2010 | Wu et al. ..................... 358/1.15 |
| 2012/0113265 | A1 * | 5/2012 | Galvin .......................... 348/159 |

(Continued)

FOREIGN PATENT DOCUMENTS

| CN | 102592443 A | 7/2012 |
| CN | 202522714 U | 11/2012 |

(Continued)

OTHER PUBLICATIONS

SIPO Office Action dated Feb. 3, 2016 in corresponding Chinese application (No. 201310552397.0).

(Continued)

*Primary Examiner* — Scott M Sciacca
(74) *Attorney, Agent, or Firm* — McClure, Qualey & Rodack, LLP

(57) ABSTRACT

A data stream generation and transmission system is provided. The system includes a cable, a data stream generation device, and a wireless transmission device connected to the data stream generation device through the cable. The data stream generation device includes a storage component and a data stream generation module. The storage component stores wireless network configuration data. The data stream generation module generates a data stream. The wireless transmission device includes a wireless module, wherein the data stream generation device is adapted to send the wireless network configuration data and the data stream to the wireless transmission device through the cable, and the wireless transmission device is adapted to use the wireless network configuration data to configure the wireless module and use the wireless module to transmit the data stream wirelessly.

12 Claims, 4 Drawing Sheets

(56) References Cited

U.S. PATENT DOCUMENTS

| | | | | |
|---|---|---|---|---|
| 2012/0170558 | A1* | 7/2012 | Forbes | H04W 88/08 |
| | | | | 370/338 |
| 2013/0336627 | A1* | 12/2013 | Calvert | 386/224 |
| 2014/0267746 | A1* | 9/2014 | Hertrich et al. | 348/159 |
| 2014/0300764 | A1* | 10/2014 | Chiang | H04N 1/00204 |
| | | | | 348/207.11 |
| 2014/0320646 | A1* | 10/2014 | Neufeld et al. | 348/143 |

FOREIGN PATENT DOCUMENTS

| | | |
|---|---|---|
| CN | 202798984 U | 3/2013 |
| CN | 202915975 U | 5/2013 |

OTHER PUBLICATIONS

SIPO Office Action dated Jul. 21, 2016 in Chinese application (No. 201310552397.0).

\* cited by examiner

DATA STREAM GENERATION AND TRANSMISSION SYSTEM AND METHOD THEREFOR

BACKGROUND

Field of the Invention

The invention relates in general to a data stream generation and transmission system and method therefor, and more particularly to a data stream generation and transmission system using a cable to combine two separate devices together and method therefor.

Related Art

Recently, Internet protocol (IP) cameras have been widely used. IP cameras are digital video cameras that may be used for security and can send and receive information via a network. Sometimes, an IP camera may be positioned outdoors, so it usually requires good waterproof and moisture-proof capabilities to protect its internal electronic components. However, good waterproof and moisture-proof capabilities are usually disadvantageous to heat dissipation and wireless data transmission. Moreover, for some IP cameras, the process of configuration and management is complex for users.

Therefore, there is a need for an IP camera security system that is capable of solving the abovementioned and other technical problems.

SUMMARY

The invention is directed to a data stream generation and transmission system and a method therefor. One of the advantages of the system is that it simplifies the configuration process of wireless devices.

According to an aspect the present invention, a data stream generation and transmission system is provided. The system comprises a cable, a data stream generation device, and a wireless transmission device connected to the data stream generation device through the cable. The data stream generation device comprises a storage component and a data stream generation module. The storage component stores wireless network configuration data. The data stream generation module generates a data stream. The wireless transmission device comprises a wireless module. The data stream generation device is adapted to send the wireless network configuration data and the data stream to the wireless transmission device through the cable. The wireless transmission device is adapted to use the wireless network configuration data to configure the wireless module and use the wireless module to transmit the data stream wirelessly.

According to another aspect the present invention, a method performed by a data stream generation and transmission system is provided. The system comprises a data stream generation device, a wireless transmission device and a cable interconnecting the data stream generation device and the wireless transmission device. The data stream generation device stores wireless network configuration data. The method comprises the following steps. First, the data stream generation device sends the wireless network configuration data to the wireless transmission device through the cable. Then, the wireless transmission device configures itself using the wireless network configuration data. Then, data stream generation device generates a data stream. Next, the data stream generation device sends the data stream to the wireless transmission device through the cable. Finally, the wireless transmission device transmits the data stream wirelessly.

The above and other aspects of the invention will become better understood with regard to the following detailed description of the embodiments. The following description is made with reference to the accompanying drawings.

DETAILED DESCRIPTION

Figure 1:
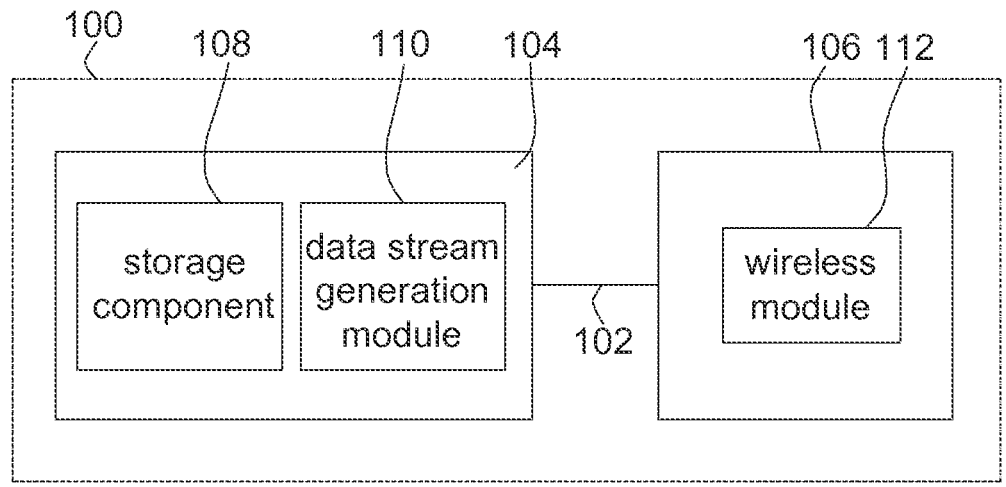
FIG. 1 illustrates a data stream generation and transmission system in accordance with an embodiment of the subject invention.

FIG. 1 shows a simplified block diagram of a data stream generation and transmission system 100 according to an embodiment of the invention. The system 100 includes a cable 102, a data stream generation device 104 and a wireless transmission device 106. The data stream generation device 104 includes a storage component 108 and a data stream generation module 110. The storage component 108 is configured to store wireless network configuration data. The data stream generation module 110 is configured to generate a data stream. The wireless transmission device 106, including a wireless module 112, is connected to the data stream generation device 104 through the cable 102. The data stream generation device 104 is adapted to send the wireless network configuration data and the data stream to the wireless transmission device 106 through the cable 102, and the wireless transmission device 106 is adapted to use the wireless network configuration data to configure the wireless module 112 and use the wireless module 112 to transmit the data stream wirelessly.

For example, the data stream generation device 104 may be an Internet Protocol (IP) camera employed for a security system. As another example, the data stream generation device 104 may be a sensor employed for a security system. The storage component 108 may be a memory such as a non-volatile memory. The data stream generation module 110 may be a video encoder. The wireless transmission device 106 may be a wireless device including an intelligent network interface card (iNIC) and a power adapter. It can be understood the present invention is not limited to the above examples.

The cable 102 provides a physical connection between the data stream generation device 104 and the wireless transmission device 106. The cable 102 can be a USB cable or an Ethernet cable. In an example, the data stream generation device 104 may record video events to generate the data stream. The data stream can then be sent to the wireless transmission device 106 through the cable 102, and further transmitted to a remote host by the wireless transmission device 106.

The wireless network configuration data stored in the storage component 108 may include a wireless module driver and at least one wireless network setting parameter. Examples of the wireless network setting parameters include Service Set Identifier (SSID), Infra-structure/Ad-hoc mode, security information (None/WEP/WPA/WPA2) and so on.

In an example, the data stream generation device 104 may include a host driver. The host driver may dynamically detect the existence of the wireless transmission device 106. When it is detected that the wireless transmission device 106 exists, the host driver loads the wireless module driver to the wireless transmission device 106. The wireless module driver is installed in the wireless transmission device 106. Also, the host driver may send the wireless network setting parameters to the wireless module 112 through the cable 102. After the wireless module driver is installed in the wireless transmission device 106 and the wireless transmission device 106 is initiated by using the wireless network setting parameters, the wireless transmission device 106 can perform wireless transmission. Therefore, the wireless transmission device 106 can transmit the data stream wirelessly to the remote host. Meanwhile, the host driver keeps monitoring the status of the wireless transmission device 106, and the data stream generation device 104 may interacts with the wireless transmission device 106 continuously.

The wireless module 112 may be, but is not limited to be, a WiFi integrated circuit (IC). Thus, the wireless module 112 may generate some heat while operating. In this embodiment, since the wireless module 112 is equipped in the wireless transmission device 106 rather than the data stream generation device 104, the data stream generation device 104 will not generate a lot of heat. With reduced heat dissipation requirements, the data stream generation device 104 may be equipped with sealed housing to protect inner electronic components from moisture penetration. Furthermore, because the data stream generation device 104 does not transceiver data wirelessly and hence can endure shielding effect, the sealed housing may even be made of metal.

The wireless transmission device 106 and the data stream generation device 104 as a whole are adapted to use only one IP address. From the system point of view, devices outside the system 100 will interact with the system 100 as if the system 100 (which is the combination of the data stream generation device 104 and the wireless transmission device 106) includes a single device. Since the data stream generation device 104 and wireless transmission device 106 as a whole are adapted to use only one IP address, the wireless transmission device 106 and the data stream generation device 104 can be configured as a single wireless device so that the complexity of configuration and management of the system 100 can be reduced.

Moreover, in this embodiment, the highest Open Systems Interconnection (OSI) layer interconnecting the data stream generation device 104 and the wireless transmission device 106 is lower than the OSI network layer. For example, the OSI network layer is an IP layer and the highest layer is an OSI physical layer or an OSI data link layer. Because of this, the wireless transmission device 106 and the data stream generation device 104 may communicate with each other through the cable 102 without using IP packets (corresponding to the OSI network layer). In an example, the wireless transmission device 106 and the data stream generation device 104 may use Ethernet packets (corresponding to the OSI physical layer) to communicate with each other through the cable 102.

In an example, the wireless transmission device 106 is adapted to supply power to the data stream generation device 104 through the cable 102. In such situation, the wireless transmission device 106 and the data stream generation device 104 are adapted to act as a power source equipment (PSE) and a corresponding powered device (PD), respectively.

Figure 2:
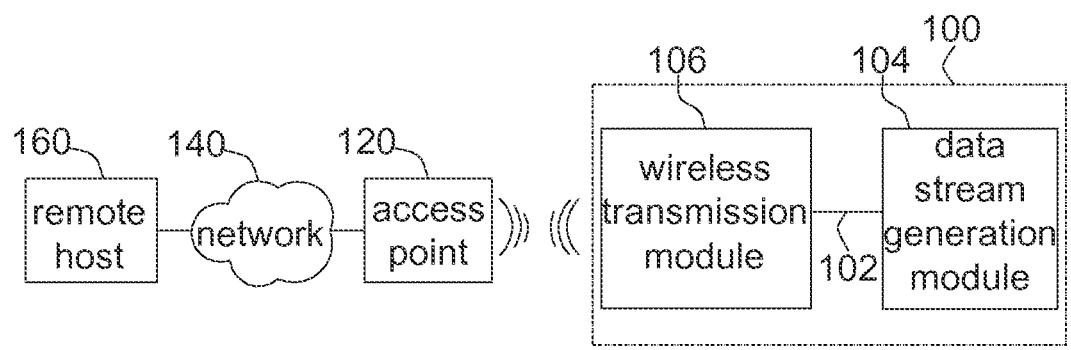
FIG. 2 illustrates a network topology of the data stream generation and transmission system.

FIG. 2 illustrates a network topology of the data stream generation and transmission system 100. As shown in FIG. 2, by using the wireless network configuration data received from the data stream generation device 104, the wireless transmission device 106 may access to the access point (AP) 120 through wireless channels. Through the AP 120, the system 100 may to be connected to the network 140 and to communicate with the remote host 160. For example, the data stream generation and transmission system 100 may transmit video data (i.e. the aforementioned data stream) to the remote host 160 through the network 140 for remote monitoring.

Figure 3:
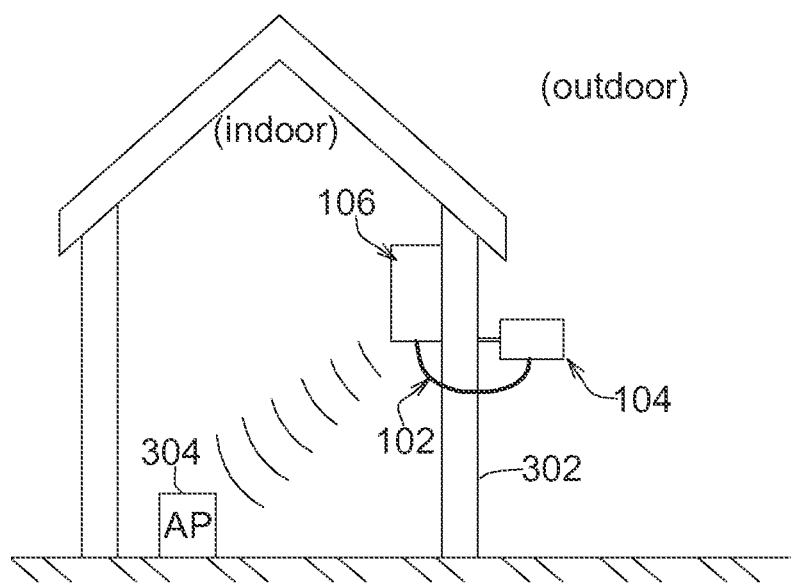
FIG. 3 illustrates the wireless transmission device and the data stream generation device that are positioned indoors and outdoors, respectively.

In the embodiment, the length of cable 102 in the system 100 is flexible. Thus, the wireless transmission device 106 and the data stream generation device 104 can be flexibly installed at two different locations and connected by the cable 102. As shown in FIG. 3, when the wireless transmission device 106 and the data stream generation device 104 are used in a house, for example, the wireless transmission device 106 and the data stream generation device 104 are positioned indoors and outdoors, respectively. The cable 102 passes through the wall 302 and connects the wireless transmission device 106 and the data stream generation device 104. In this example, the wireless transmission device 106 may communicate with the AP 304 through wireless channels.

Figure 4:
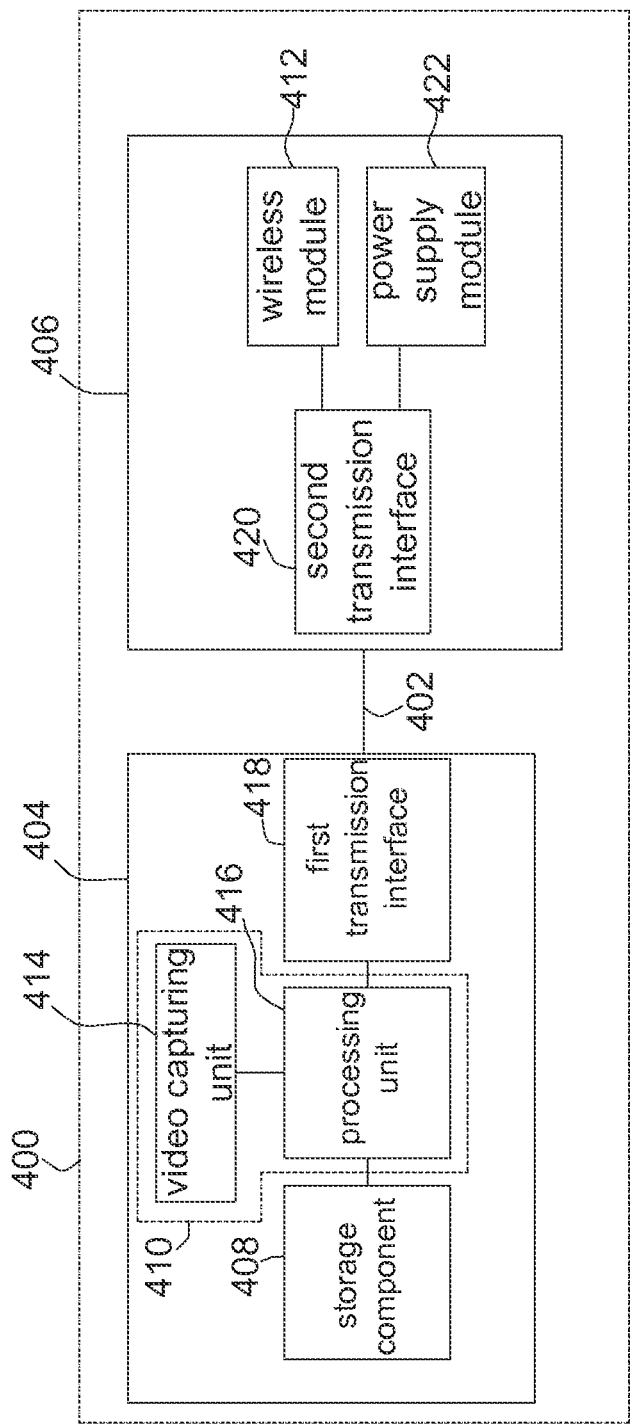
FIG. 4 illustrates a block diagram of a data stream generation and transmission system according to another embodiment of invention.

FIG. 4 illustrates a simplified block diagram of the data stream generation and transmission system 400 according to another embodiment of invention. The system 400 includes a cable 402, a data stream generation device 404 and a wireless transmission device 406. The data stream generation device 404 includes a storage component 408, a data stream generation module 410 and first transmission interface 418. The wireless transmission device 406 includes a wireless model 412 and a second transmission interface 420.

The data stream generation module 410 includes a video capturing unit 414 and a processing unit 416. The video capturing unit 414 captures video events in a monitored area. The processing unit 416 is capable of encoding the captured video events to generate the data stream, and able to output the data stream and the wireless network configuration data stored in the storage component 408 to the first transmission interface 418. The first transmission interface 418 delivers the wireless network configuration data and the data stream to the second transmission interface 420 of the wireless transmission device 406 through the cable 402. Similarly, in this embodiment, the highest OSI layer interconnecting the data stream generation device 404 and the wireless transmission device 406 is lower than the OSI network layer. In other words, the first transmission interface 418 and the second transmission interface 420 use protocols lower than the OSI network layer to communicate with each other. For example, the first transmission interface 418 and the second transmission interface 420 are OSI physical layer chips.

The wireless transmission device 406 may further include a power supply module 422 coupled to the second transmission interface 420. The power supply module 422 is adapted to supply power to the data stream generation device 404 through the cable 402. In an example, power over Ethernet (PoE) technique is applied in the system 400. By using the PoE technique, both data transmission and power providing can be performed in the same cable 402, so that the data stream generation device 404 does not require a separate cable for providing power, thereby the cost of cable can be decreased.

Figure 5:
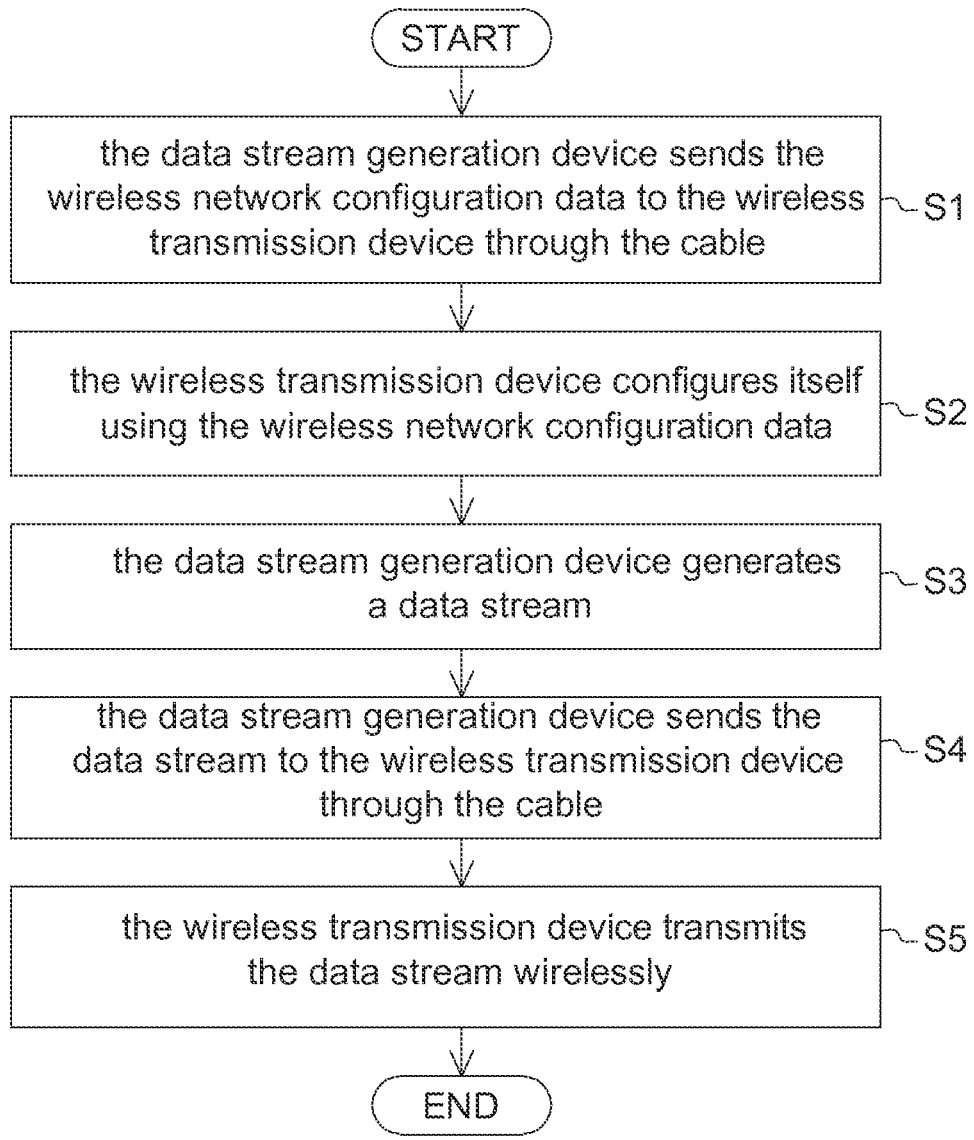
FIG. 5 illustrates a flow diagram of a method performed by a data stream generation and transmission system according to the embodiment of the invention.

FIG. 5 illustrates a flow diagram of a method performed by a data stream generation and transmission system according to the embodiments of the present invention. The system includes a data stream generation device, a wireless transmission device and a cable interconnecting the data stream generation device and the wireless transmission device. The data stream generation device stores wireless network configuration data. First, at step S1, data stream generation device sends the wireless network configuration data to the wireless transmission device through the cable. Then, at step S2, the wireless transmission device configures itself, e.g. configures a wireless module contained therein, using the wireless network configuration data. Then, at step S3, the data stream generation device generates a data stream. Next, at step S4, the data stream generation device sends the data stream to the wireless transmission device through the cable. Finally, at step S5, the wireless transmission device transmits the data stream wirelessly.

The data stream generation and transmission system according to the embodiments of the invention has at least the following advantages:

(i) Easy to configure: since network settings of only one device (the data stream generation device) instead of two (the data stream generation device and the wireless transmission device) should be configured, the complexity of configuration and management of the system can be reduced. For example, after network setting of the data stream generation device is configured, the data stream generation device will execute the driver to automatically configure the wireless transmission device. Therefore, the user only needs to configure network setting of the data stream generation device. The configuration of the wireless transmission device will be automatically completed by the data stream generation device. Therefore, for some IP cameras, the process of configuration and management for the data stream generation and transmission system is easy and time-saving for users.

(ii) Good heat dispassion performance: since the wireless module is equipped in the wireless transmission device rather than in the data stream generation device, the data stream generation device will not generate too much heat. Therefore, the data stream generation device may be equipped with sealed housing to protect the electronic components therein from moisture penetration.

Moreover, an IP camera may need to be positioned outdoors, so it may require good waterproof and moisture-proof capabilities. However, good waterproof and moisture-proof capabilities are usually disadvantageous to heat dissipation and wireless data transmission. In contrast, the data stream generation device of the embodiments of the invention is not equipped with the wireless module, so it generally does not generate a lot of heat. As such, even though the data stream generation device of the embodiments is positioned outdoors and has good waterproof and moisture-proof treatments, the data stream generation device of the embodiments still has sufficient heat dissipation performance. Besides, since the wireless transmission device can be positioned indoors, the wireless transmission device does not need sealed waterproof and moisture-proof casing, thereby good heat dissipation and better wireless performance can be achieved.

(iii) Flexible to install: in the embodiments, the length of cable in the data stream generation and transmission system is flexible. Thus, the wireless transmission device and the data stream generation device can be flexibly installed at two different locations and connected by the cable. For example, the wireless transmission device and the data stream generation device can be positioned indoors and outdoors, respectively.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data stream generation and transmission system, comprising:
   a cable;
   a digital video camera, comprising:
   a storage component, for storing wireless network configuration data; and
   a video encoder, for generating a data stream; and
   a wireless transmission device connected to the digital video camera through the cable, comprising:
   a wireless module;
   wherein the digital video camera is adapted to send the wireless network configuration data and the data stream to the wireless transmission device through the cable, and the wireless transmission device is adapted to use the wireless network configuration data to configure the wireless module and use the wireless module to transmit the data stream wirelessly;
   wherein the wireless network configuration data comprises a wireless module driver and at least one of a Service Set Identifier (SSID), an indication of infra-structure/ad-hoc mode and WEP/WPA/WPA2 security information, the digital video camera dynamically detects the existence of the wireless transmission device, and when the digital video camera detects that the wireless transmission device exists, the digital video camera loads the wireless module driver to the wireless transmission device, and sends the at least one of the SSID, the indication of infra-structure/ad-hoc mode and the WEP/WPA/WPA2 security information to the wireless transmission device.

2. The data stream generation and transmission system of claim 1, wherein the wireless transmission device is adapted to supply power to the digital video camera through the cable.

3. The data stream generation and transmission system of claim 1, wherein the wireless transmission device and the digital video camera as a whole are adapted to use only one IP address.

4. The data stream generation and transmission system of claim 1, wherein a highest OSI layer interconnecting the digital video camera and the wireless transmission device is lower than a network layer.

5. The data stream generation and transmission system of claim 1, wherein the wireless transmission device and the digital video camera are adapted to communicate with each other through the cable without using IP packets.

6. The data stream generation and transmission system of claim 1, wherein the cable is an Ethernet cable, and the wireless transmission device and the digital video camera are adapted to act as a power source equipment (PSE) and a corresponding powered device (PD), respectively.

7. A method performed by a data stream generation and transmission system, the system comprising a digital video camera, a wireless transmission device, and a cable interconnecting the digital video camera and the wireless transmission device, the digital video camera storing wireless network configuration data, the method comprising:

sending the wireless network configuration data from the digital video camera to the wireless transmission device through the cable;

using the wireless network configuration data to configure the wireless transmission device;

using the digital video camera to generate a data stream;

sending the data stream from the digital video camera to the wireless transmission device through the cable; and using the wireless transmission device to transmit the data stream wirelessly;

wherein the wireless network configuration data comprises a wireless module driver and at least one of a Service Set Identifier (SSID), an indication of infra-structure/ad-hoc mode and WEP/WPA/WPA2 security information, and the method further comprises:

dynamically detecting the existence of the wireless transmission device by the digital video camera; and when the digital video camera detects that the wireless transmission device exists, loading the wireless module driver from the digital video camera to the wireless transmission device, and sending the at least one of the SSID, the indication of infra-structure/ad-hoc mode and the WEP/WPA/WPA2 security information to the wireless transmission device.

8. The method according to claim 7, further comprising: supplying power to the digital video camera through the cable by the wireless transmission device.

9. The method according to claim 7, wherein the wireless transmission device and the digital video camera as a whole are adapted to use only one IP address.

10. The method according to claim 7, wherein a highest OSI layer interconnecting the digital video camera and the wireless transmission device is lower than a network layer.

11. The method according to claim 7, wherein the wireless transmission device and the digital video camera are adapted to communicate with each other through the cable without using IP packets.

12. The method according to claim 7, wherein the cable is an Ethernet cable, and the wireless transmission device and the digital video camera are adapted to act as a power source equipment (PSE) and a corresponding powered device (PD), respectively.

\* \* \* \* \*